(12) United States Patent
Yamada et al.

(10) Patent No.: US 7,713,631 B2
(45) Date of Patent: May 11, 2010

(54) METHOD OF MANUFACTURING LAMINATED GLASS FOR VEHICLE AND LAMINATED GLASS FOR VEHICLE

(75) Inventors: Kazuo Yamada, Tokyo (JP); Shinichi Nishimoto, Tokyo (JP); Takahiro Shimomura, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 341 days.

(21) Appl. No.: 11/904,083

(22) Filed: Sep. 26, 2007

(65) Prior Publication Data

US 2008/0096026 A1    Apr. 24, 2008

(30) Foreign Application Priority Data

Sep. 26, 2006    (JP)    ............................. 2006-260492

(51) Int. Cl.
   *B32B 17/06*    (2006.01)
   *B32B 37/14*    (2006.01)

(52) U.S. Cl. .................... 428/426; 428/195.1; 428/210; 428/432; 428/913; 156/60; 156/89.11; 156/99; 156/212

(58) Field of Classification Search ................. 428/426, 428/432, 195.1, 210, 913; 156/60, 89.11, 156/99, 212
See application file for complete search history.

(56) References Cited

U.S. PATENT DOCUMENTS

| | | | |
|---|---|---|---|
| 3,300,351 A | 1/1967 | Richardson | |
| 3,904,460 A | 9/1975 | Comperatore | |
| 5,383,990 A | 1/1995 | Tsuji | |
| 5,418,025 A | 5/1995 | Harmand et al. | |
| 6,582,799 B1 | 6/2003 | Brown et al. | |
| 2005/0089691 A1 | 4/2005 | Noguchi et al. | |
| 2007/0128446 A1 | 6/2007 | Maegawa | |

FOREIGN PATENT DOCUMENTS

| | | |
|---|---|---|
| JP | 64-053726 U | 4/1989 |
| JP | 2003-500260 A | 1/2003 |
| JP | 2005-29083 | 2/2005 |
| JP | 2005-213101 | 8/2005 |
| WO | WO 03/055821 A1 | 7/2003 |

*Primary Examiner*—Ling Xu
(74) *Attorney, Agent, or Firm*—Hamre, Schumann, Mueller & Larson, P.C.

(57) ABSTRACT

A ceramic paste is applied to a first glass sheet 11, and a ceramic paste is applied to a second glass sheet 13 with a lower solar absorptivity than that of the first glass sheet 11. In this case, the amount per unit area of the ceramic paste to be applied to the first glass sheet 11 is allowed to be smaller than that of the ceramic paste to be applied to the second glass sheet 13. Alternatively, a first ceramic paste and a second ceramic paste are allowed to have different compositions from each other. The first glass sheet 11 and the second glass sheet 13 are bent so that the surfaces onto which the ceramic pastes have been applied are shaped as concave surfaces. The applied ceramic paste is fired using the heating used for bending. Thus maskings 12 and 14 are formed. The first glass sheet 11 and the second glass sheet 13 are bonded to each other, with a resin interlayer film 15 being interposed therebetween.

15 Claims, 7 Drawing Sheets

METHOD OF MANUFACTURING LAMINATED GLASS FOR VEHICLE AND LAMINATED GLASS FOR VEHICLE

BACKGROUND OF THE INVENTION

1. Field of the Invention

The present invention relates to a method of manufacturing a laminated glass for vehicles, and a laminated glass for vehicles.

2. Related Background Art

For window glasses of automobiles, laminated glasses are used, each of which is formed of two glass sheets bonded to each other with a resin interlayer film interposed therebetween and dark-colored maskings provided for the peripheral parts thereof in the form of a frame (for instance, JP 2005-213101 A, JP2005-29083 A). The maskings are referred to often as "ceramic prints". The maskings are intended to prevent an adhesive for fixing a window glass to a window frame from deteriorating due to solar radiation and to improve the appearance by shielding terminals of heating wires or a deicer.

Figure 8:
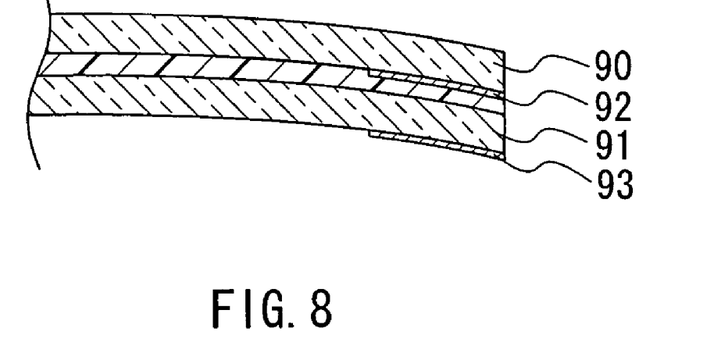
FIG. 8 is a cross-sectional view showing a conventional laminated glass for vehicles.

The maskings each are formed by printing a ceramic paste on peripheral parts of glass sheets to be bonded to each other and firing the ceramic paste that has been printed. Firing of the ceramic paste proceeds simultaneously with bending of the glass sheets, using the heating used for bending. Generally, the place where a masking is to be provided is an inner surface of a glass sheet (inner sheet) located on the inner side of the car or an inner surface of a glass sheet (outer sheet) located on the outer side of the car. As shown in FIG. 8, depending on products, both the inner surface of the outer sheet 90 and the inner surface of the inner sheet 91 are provided with maskings 92 and 93, respectively.

Figure 9:
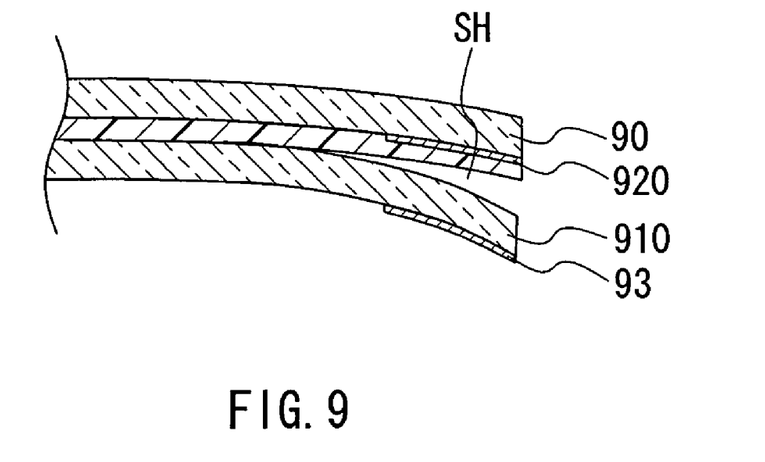
FIG. 9 is a schematic view for explaining a problem in a conventional laminated glass for vehicles.

Recently, there are increasing needs for laminated glasses to be used as window glasses for automobiles. Such laminated glasses include one formed of a common bent glass sheet and a bent glass sheet with a lower solar transmittance that are bonded to each other with an interlayer film interposed therebetween so as to reduce the transmission of solar radiation into the inside of the car, and one in which the glass sheet located on the inner side of the car is thinner in order to maintain the strength against, for example, stones that are thrown up by oncoming cars that strike the glass while reducing the weight of the window glass. Generally, since two bent glass sheets are obtained by being bent with the same mold, it is considered that they can be laminated together, with no gap being generated therebetween. However, that is not necessarily the case. When maskings are intended to be formed by printing a ceramic paste in the same pattern on glass sheets of different types and/or different thicknesses from each other and firing the ceramic paste using the heating used for bending the glass sheets, the outer sheet 90 and inner sheet 91 may not coincide with each other in the bend degree due to firing shrinkage of the ceramic pastes 920 and 930 as shown in FIG. 9. Accordingly, a gap SH (hereinafter also referred to as an "edge gap") may be generated at the peripheral parts of the two glass sheets 90 and 91 that have been laminated together.

SUMMARY OF THE INVENTION

With the aforementioned problems in mind, the present invention is intended to provide methods of manufacturing a laminated glass for vehicles in which no edge gap is generated between the glass sheets that have been laminated together even when a masking is formed on each of the glass sheets of different types and/or different thicknesses and then they are bonded to each other. Furthermore, the present invention provides laminated glasses for vehicles manufactured by such methods.

That is, the present invention provides a method of manufacturing a laminated glass for vehicles, with the method including:

A1: applying a first ceramic paste onto a principal surface of a peripheral part of a first glass sheet;

A2: applying a second ceramic paste onto a principal surface of a peripheral part of a second glass sheet having a lower solar transmittance than that of the first glass sheet;

B: bending the first glass sheet and the second glass sheet while forming dark-colored maskings by firing the first ceramic paste and the second ceramic paste applied to the respective glass sheets; and C: bonding the first glass sheet and the second glass sheet that have been bent to each other, with a resin interlayer film being interposed therebetween, wherein in the processes (A1) and (A2), in order to reduce the difference in bend degree between the peripheral parts of the first glass sheet and the second glass sheet, which is caused by firing shrinkages of the first ceramic paste and the second ceramic paste in the process (B), (i) an amount per unit area of the first ceramic paste to be applied to the first glass sheet is allowed to be different from that of the second ceramic paste to be applied to the second glass sheet, and/or (ii) the first ceramic paste and the second ceramic paste are allowed to have different compositions from each other.

Furthermore, the present invention provides a laminated glass for vehicles including:

a first glass sheet that has been bent;

a second glass sheet that has been bent in an identical shape to that of the first glass sheet and has been bonded thereto with a resin interlayer film interposed therebetween, the second glass sheet having a lower solar transmittance than that of the first glass sheet;

a dark-colored first masking that has been provided on a concave surface of a peripheral part of the first glass sheet; and a dark-colored second masking that has been provided on a concave surface of a peripheral part of the second glass sheet, wherein (i) the first masking has a higher visible-light transmittance than that of the second masking and/or (ii) the first masking has a weight per unit area that is less than that of the second masking.

In the manufacturing methods described above, in order to reduce the difference in bend degree between the peripheral parts of the first glass sheet and the second glass sheet, which is caused by firing shrinkage of the ceramic paste, the amount per unit area of the first ceramic paste to be applied to the first glass sheet is allowed to be different from that of the second ceramic paste to be applied to the second glass sheet. Alternatively, the first ceramic paste to be applied to the first glass sheet and the second ceramic paste to be applied to the second glass sheet are allowed to have different compositions from each other. Further, these methods may be combined.

This allows the difference in thermal characteristics between the first glass sheet and the second glass sheet to be cancelled out by the difference in effects of firing shrinkage of the ceramic pastes. Accordingly, it is possible to prevent the difference in bend degree between the peripheral parts of the first glass sheet and the second glass sheet from becoming excessively large. The edge gap can be reduced considerably by reducing the difference in bend degree between the peripheral parts of the first glass sheet and the second glass sheet as much as possible, preferably by allowing the bend degrees thereof to coincide with each other. As a result, the first glass sheet and the second glass sheet can be bonded reliably to each other without applying excessively high pressure or using a special resin interlayer film.

In laminated glasses for vehicles, the results of the manufacturing methods appear in the form of a difference in shielding ratio between maskings (sintered bodies of ceramic pastes). That is, in the laminated glasses for vehicles of the present invention, the first masking provided for the first glass sheet has a lower shielding ratio with respect to incident light than that of the second masking provided for the second glass sheet. In other words, the first masking has a higher transmittance with respect to incident light than that of the second masking. Alternatively, the weight per unit area of the first masking is less than that of the second masking.

DETAILED DESCRIPTION OF THE INVENTION

Embodiments of the present invention are described below with reference to the attached drawings.

Figure 1:
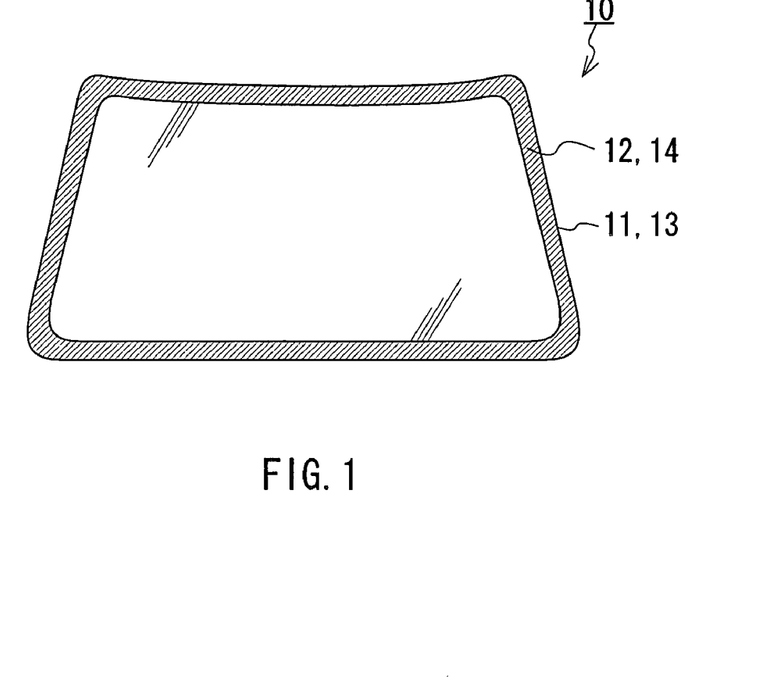
FIG. 1 is a cross-sectional view showing a laminated glass for vehicles according to an embodiment of the present invention.
Figure 2:
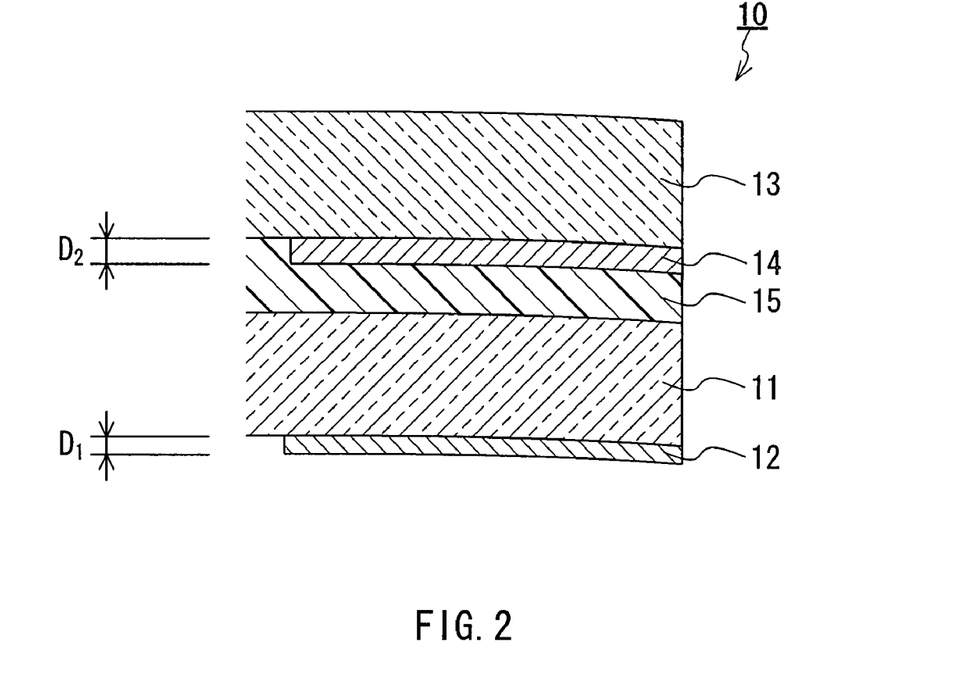
FIG. 2 is an enlarged cross-sectional view showing the peripheral part of the laminated glass for vehicles shown in FIG. 1.

FIG. 1 is a plan view showing an example in which a laminated glass for vehicles according to the present invention (hereinafter also referred to simply as a "laminated glass") was used for a windshield of an automobile. FIG. 2 is an enlarged sectional view of a peripheral part of the laminated glass shown in FIG. 1. The laminated glass 10 includes: a first glass sheet 11 that has been bent; a second glass sheet 13 that has been bent in an identical shape to that of the first glass sheet 11 and is bonded thereto; and a resin interlayer film 15 that is interposed between the first glass sheet 11 and the second glass sheet 13 and bonds them to each other. The first glass sheet 11 is an inner sheet to be located on the inner side of the car, while the second glass sheet 13 is an outer sheet to be located on the outer side of the car. A dark-colored first masking 12 is provided on the concave surface of the peripheral part of the first glass sheet 11 in the form of a frame. Similarly, a dark-colored second masking 14 is provided on the concave surface of the peripheral part of the second glass sheet 13 in the form of a frame in a region where it substantially coincides with the first masking 12 when the first glass sheet 11 and the second glass sheet 13 are laminated together.

The first glass sheet 11 and the second glass sheet 13 each are formed of soda-lime glass with a composition that is suitable for window glass for vehicles. However, they are different in composition from each other. Specifically, the compositions thereof are adjusted so as to allow the second glass sheet 13 to have a lower solar transmittance than that of the first glass sheet 11. The second glass sheet 13 is formed of so-called heat absorbing glass or ultraviolet and infrared absorbing glass in which the content of Fe contributing to the absorption of infrared and ultraviolet rays is larger than that in the first glass sheet 11 and Ce and Ti contributing to the absorption of ultraviolet rays have been added. Generally, a large content of Fe results in a glass tinged with a light green color. The color can be adjusted to another one by allowing other elements such as Ce, Co, Ni, Se, etc. to be present together with Fe. The first glass sheet 11 is formed of common clear glass that has not been colored intentionally and has a higher solar transmittance than that of the second glass sheet 13. Typical compositions of the first glass sheet 11 and the second glass sheet 13 are indicated below.

<Composition of First Glass Sheet 11>

$SiO_2$: 70 to 73 wt %

$Al_2O_3$: 0.6 to 2.4 wt %

CaO: 7 to 12 wt %

MgO: 1.0 to 4.5 wt %

$R_2O$: 13 to 15 wt % (R denotes alkali metal)

Total iron oxide (T-$Fe_2O_3$) in terms of $Fe_2O_3$: 0.08 to 0.14 wt %

<Composition of Second Glass Sheet 13>

The composition of heat absorbing glass or ultraviolet and infrared absorbing glass that can be used for the second glass sheet 13 may be one in which, for example, the ratio of total iron oxide (T-$Fe_2O_3$) in terms of $Fe_2O_3$ is 0.4 to 1.3 wt %, the ratio of $CeO_2$ is 0 to 2 wt %, and the ratio of $TiO_2$ is 0 to 1 wt %, with the composition of the first glass sheet being taken as a reference, and the contents of glass skeleton components (mainly $SiO_2$ and $Al_2O_3$) are reduced by increased contents of T-$Fe_2O_3$, $CeO_2$, etc. In the present embodiment, a heat absorbing glass containing T-$Fe_2O_3$ whose ratio is approximately 0.5 wt % is used as the second glass sheet 13.

The solar transmittances of the glass sheets 11 and 13 are indicated as values obtained in a wavelength region of 300 to 2500 nm as defined in Japanese Industrial Standards (JIS) R3106:1998. The first glass sheet 11 and the second glass sheet 13 that are used in the embodiment also can be differentiated by the transmittance obtained at a predetermined wavelength in the infrared region (for example, a wavelength of 1550 nm). In this case, the first glass sheet 11 formed of clear glass has a higher heat-ray transmittance, while the second glass sheet 13 formed of heat absorbing glass has a lower heat-ray transmittance.

In the laminated glass 10 shown in FIG. 2, the thickness of the first glass sheet 11 is identical to that of the second glass sheet 13. Furthermore, the composition of the first masking 12 is identical to that of the second masking 14. However, the thickness $D_1$ of the first masking 12 is thinner than the thickness $D_2$ of the second masking 14. In other words, the weight of the first masking 12 that exists per unit area of the first glass sheet 11 is less than that of the second masking 14 that exists per unit area of the second glass sheet 13. Accordingly, the edge gap SH as described with reference to FIG. 9 can be prevented from being generated between the first glass sheet 11 and the second glass sheet 13 by providing maskings 12 and 14 whose thicknesses $D_1$ and $D_2$ are suitable for the respective glass sheets 11 and 13, i.e. by allowing the amounts of the ceramic pastes for forming the maskings that are applied to the respective glass sheets to be different from each other.

However, in order to secure the properties as maskings, the first masking 12 and the second masking 14 need to have at least a certain level of shielding ability. For instance, when one glass sheet with a masking has a visible-light transmittance of 2% or lower, the shielding ability thereof can be considered to be sufficient. The solar transmittance is known to be a smaller value than that of the visible-light transmittance.

Generally, the first masking 12 and the second masking 14 are sintered bodies of ceramic pastes containing black or dark brown inorganic pigments and glass frits. The inorganic pigments to be used herein can be, for example, CuO, $Cr_2O_3$, $Fe_2O_3$, $TiO_2$, MnO, etc. The glass frits to be used herein can be, for example, low melting borosilicate glass. The ceramic paste for the maskings 12 and 14 can be prepared by mixing and kneading such pigments and glass frits with suitable amounts of organic solvent and resin binder. Specifically, a suitable ceramic paste contains 65 to 70 wt % of glass frits, 10 to 15 wt % of inorganic pigments, 15 to 20 wt % of organic solvent, and 2 to 10 wt % of resin binder. In the laminated glass 10 shown in FIGS. 1 and 2, the shapes of the first masking 12 and the second masking 14 substantially coincide with each other in the in-plane direction.

The resin interlayer film 15 is a common film that is used for laminated glasses, such as a polyvinyl butyral film (PVB), an ethylene vinyl acetal film (EVA), etc.

The method of manufacturing a laminated glass for vehicles shown in FIG. 1 is described.

First, two types of glass sheets are produced by a known method such as a float glass process. One of them is a glass sheet formed of clear glass described earlier. The other is a glass sheet formed of a heat absorbing glass or ultraviolet and infrared absorbing glass described earlier. Each of the glass sheets is cut into a predetermined shape that allows it to fit into a vehicle window frame and then the edge thereof is ground. Thus the first glass sheet 11 and the second glass sheet 13 can be prepared.

Figure 3A:
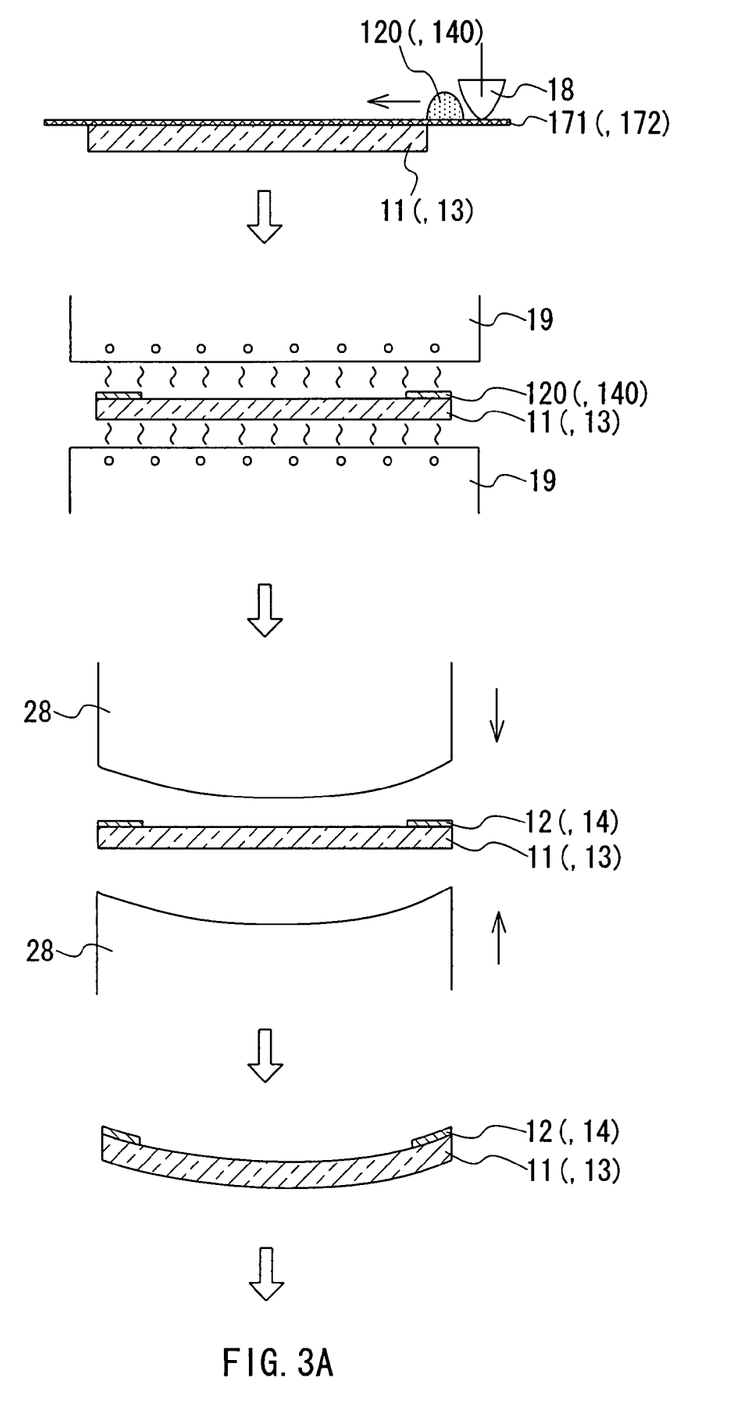
FIG. 3A is a diagram explaining processes of a method of manufacturing a laminated glass for vehicles according to an embodiment of the present invention.

Next, as shown in the drawing for explaining processes in FIG. 3A, a ceramic paste 120 (a first ceramic paste) is applied onto the principal surface of a peripheral part of the first glass sheet 11. A ceramic paste 140 (a second ceramic paste) is applied onto the principal surface of a peripheral part of the second glass sheet 13 in the same manner as in the case of the first glass sheet 11. The ceramic paste 120 to be applied to the first glass sheet 11 and the ceramic paste 140 to be applied to the second glass sheet 13 can have the same composition. However, the amount per unit area of the ceramic paste 120 to be applied to the first glass sheet 11 is less than that of the ceramic paste 140 to be applied to the second glass sheet 13.

The paste application process in which the ceramic pastes 120 and 140 are applied to the first glass sheet 11 and the second glass sheet 13 can be carried out by a printing method using screen masks 171 and 172, respectively. The amounts of the ceramic pastes 120 and 140 to be applied to the glass sheets 11 and 13, respectively, can be adjusted by allowing the first screen mask 171 and the second screen mask 172 to be different from each other in design conditions such as the size and density of apertures, i.e. by adjusting the coarseness of meshes. For instance, the first screen mask 171 that is used for the first glass sheet 11 is allowed to have a fine mesh, while the second screen mask 172 that is used for the second glass sheet 13 is allowed to have a coarse mesh. This allows the thickness of the ceramic paste 120 applied to the first glass sheet 11 to be thinner than that of the ceramic paste 140 applied to the second glass sheet 13.

Figure 4A:
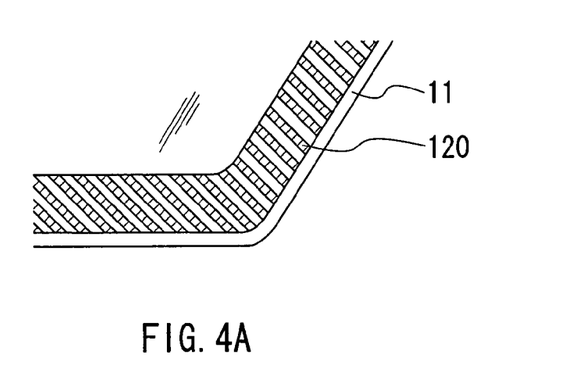
FIG. 4A is a schematic view showing another example of a printed pattern of a ceramic paste.
Figure 4B:
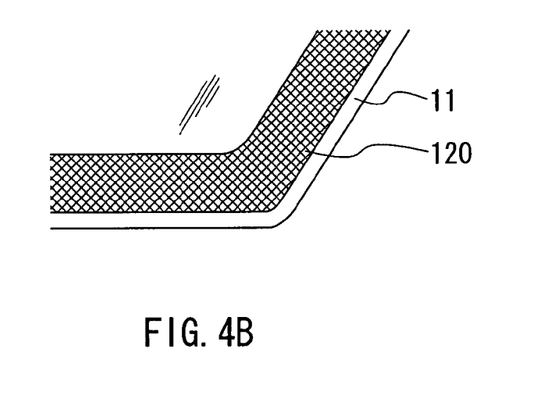
FIG. 4B is a schematic view showing another example of a printed pattern of a ceramic paste.
Figure 4C:
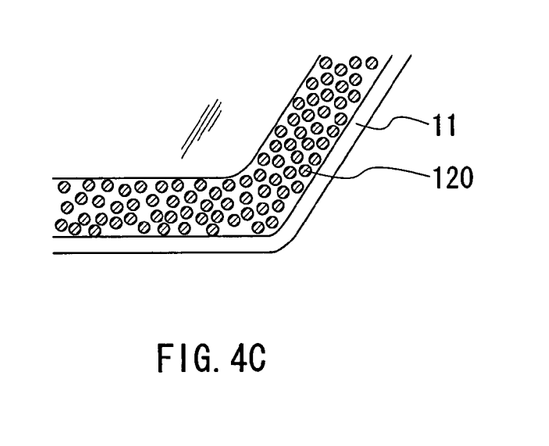
FIG. 4C is a schematic view showing another example of a printed pattern of a ceramic paste.

The difference in amount of the ceramic paste to be applied may be obtained by allowing the pattern in which the ceramic paste 120 is applied to the first glass sheet 11 to be different from that in which the ceramic paste 140 is applied to the second glass sheet 13, i.e. by allowing the printing patterns formed with the screen masks 171 and 172 to be different from each other. For instance, a common solid pattern is employed for the pattern in which the ceramic paste 140 is printed on the second glass sheet 13. On the other hand, the band shape as shown in FIG. 4A, the mesh shape as shown in FIG. 4B, or the sea-island shape as shown in FIG. 4C is employed for the pattern in which the ceramic paste 120 is printed on the first glass sheet 11. In this case, the amount per unit area of the ceramic paste to be applied can be adjusted easily.

When the pattern in which the ceramic paste is printed on the first glass sheet 11 is the band shape, mesh shape, or sea-island shape, the masking that has been fired has regions free of ceramic to be exact. However, the masking that has been fired on the second glass sheet 13 has a solid pattern that covers the whole surface in a predetermined region and has sufficiently high shielding ability. Hence, when the masking part is observed from the outside of the car, no sense of discomfort arises. Similarly when the masking part is observed from the inside of the car, no sense of discomfort arises. Furthermore, a fine printed pattern is difficult to differentiate from a solid pattern at a glance.

Even when using the screen masks of the same specification, it is possible to control the thicknesses of the maskings 12 and 14 to be formed, by allowing the composition of the ceramic paste 120 (first ceramic paste) to be applied to the first glass sheet 11 to be different from that of the ceramic paste 140 (second ceramic paste) to be applied to the second glass sheet 13. For instance, the viscosity of the ceramic paste 120 to be applied to the first glass sheet 11 is allowed to be different from that of the ceramic paste 140 to be applied to the second glass sheet 13. The difference in viscosity results in a difference in thickness between the ceramic pastes applied to the glass sheets 11 and 13. Specifically, the ceramic paste 120 to be applied to the first glass sheet 11 is allowed to have a lower viscosity by using a larger amount of solvent contained therein, while the ceramic paste 140 to be applied to the second glass sheet 13 is allowed to have a higher viscosity by using a smaller amount of solvent contained therein. Furthermore, the viscosities of the ceramic pastes 120 and 140 can be adjusted by changing the size distribution of pigments and glass frits that are contained therein. The compositions of the pigments and glass frits that are contained in the respective ceramic pastes 120 and 140 can be identical to or different from each other.

It should be understood that the method of using different printing patterns (amounts of the ceramic pastes to be applied) can be used in combination with the method of using ceramic pastes whose compositions are different from each other. Besides, it also is possible to control the printed thicknesses of the ceramic pastes 120 and 140 by changing the printing conditions such as the pressure that is applied to a squeegee 18, the material of the squeegee 18, the inclination of the squeegee 18, etc.

In other words, the ceramic pastes 120 and 140 are printed on the respective glass sheets 11 and 13, respectively, in such a manner as to obtain as small a difference as possible in bend degree between the peripheral parts of the first glass sheet 11 and the second glass sheet 13 when the first glass sheet 11 and the second glass sheet 13 are bent. It is difficult to define minimal differences in the amounts of the ceramic paste to be applied and the compositions of the ceramic pastes. However, the minimal differences having an effect on reducing the difference in bend degree may be required.

After or before the ceramic pastes 120 and 140 are printed, a Ag paste for forming a deicer or heating wires can be printed on the first glass sheet 11 and the second glass sheet 13.

The description is continued with reference to FIG. 3A again. After completion of printing the ceramic paste 120 or 140, the printed ceramic paste 120 or 140 is dried. Subsequently, as shown in FIG. 3A, the glass sheet 11 or 13 is carried into a heating furnace 19 and is heated to a temperature that allows it to be bent and thereby is softened. In this stage, the ceramic paste 120 or 140 is fired simultaneously to form the dark-colored masking 12 or 14 (the heating/firing process). The temperature inside the furnace for heating the first glass sheet 11 can be identical to that for heating the second glass sheet 13.

Next, the glass sheet 11 or 13 that has been heated sufficiently is taken out of the heating furnace 19. Then it is sandwiched in a mold 28 and thereby is bent so that the surface thereof with the masking 12 or 14 formed thereon (the surface thereof with the ceramic paste applied thereonto) becomes a concave surface (the bending process). The mold 28 to be used for bending the first glass sheet 11 can be the same as the mold 28 to be used for bending the second glass sheet 13. Furthermore, the press-bending method using the mold 28 can be performed in the heating furnace 19. The respective glass sheets 11 and 13 can be bent individually or can be bent together while being stacked together. As in the present embodiment, in the case where the two glass sheets 11 and 13 are different in composition or thickness from each other, the shaping precision improves when the first glass sheet 11 and the second glass sheet 13 are bent individually.

Moreover, when both the glass sheets 11 and 13 are subjected to the bending process in the same production line, the productivity can be improved. In the same production line, the conditions for bending the first glass sheet 11, such as the heating temperature in the heating furnace, the mold for bending, etc. can be identical to those for bending the second glass sheet 13.

On the other hand, when they are subjected to the bending process in different production lines, the conditions for bending them can be different from each other (however, the bending shape is the same). When the conditions for bending them are different from each other, for example, it is possible to select the bending conditions that are further suitable for the respective glass sheets 11 and 13 depending on the compositions and thicknesses of the glasses. Thus the different conditions for bending them are further preferred in combination with the different compositions and amounts of the ceramic pastes to be applied. Furthermore, the self-weight bending method in which a glass sheet is bent by its own weight also can be employed instead of the press-bending method.

The glass sheets 11 and 13 thus bent are cooled slowly to a suitable temperature.

As in the conventional manner, when maskings are formed by printing ceramic pastes with the same thickness regardless of the different thermal characteristics of the glass sheets themselves, the bend degree of the masking portion of one glass sheet tends to be different from that of the other glass sheet (see FIG. 9). On the other hand, according to the present invention, the difference in effects resulted from the firing shrinkage of the ceramic pastes 120 and 140 cancels out the difference in thermal characteristics between the first glass sheet 11 and the second glass sheet 13. As a result, the difference in bend degree between the peripheral parts of the first glass sheet 11 and the second glass sheet 13 can be reduced. Specifically, the peripheral part of the first glass sheet 11 can be prevented from bending more than that of the second glass sheet 13.

The bend degree of the peripheral part of a glass sheet can be considered as the curvature of the region where the masking is formed. The smaller the curvature, the larger the bend degree, while the larger the curvature, the smaller the bend degree.

Figure 3B:
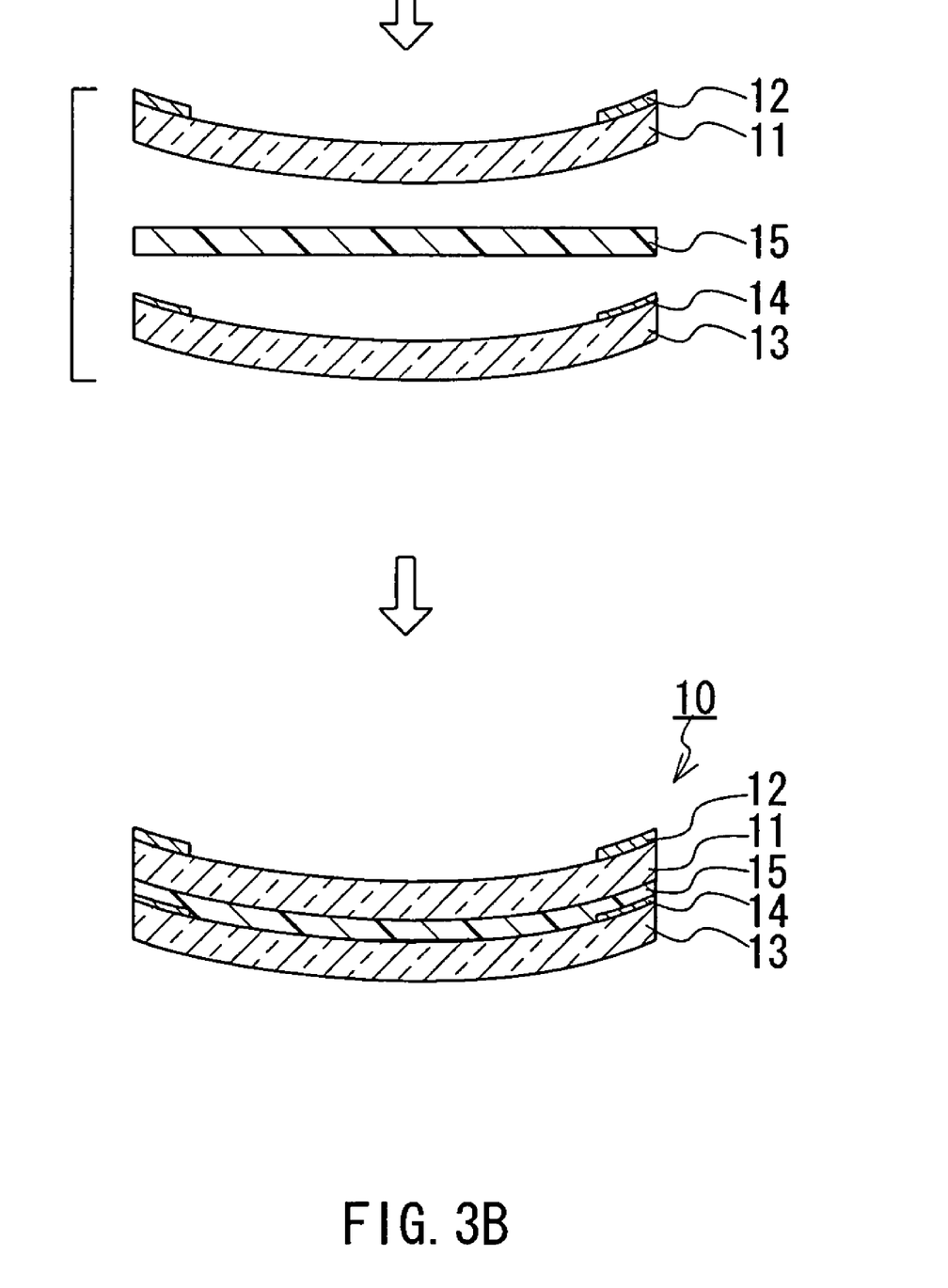
FIG. 3B is a diagram explaining a process following the processes shown in FIG. 3A.

Next, as shown in FIG. 3B, the first glass sheet 11 and the second glass sheet 13 that have been bent are stacked together with the resin interlayer film 15 interposed therebetween and then are heated and pressed in an autoclave to be bonded to each other (the bonding process). With the manner described above, the laminated glass 10 shown in FIGS. 1 and 2 is obtained. Since a stacked assembly composed of the first glass sheet 11, the second glass sheet 13, and the resin interlayer film 15 has almost no edge gaps, they can be bonded together without excessive pressure being applied thereto, with no gaps being generated, and the yield in the bonding process also is improved.

Another example of a laminated glass for vehicles according to the present invention is described below.

Figure 5:
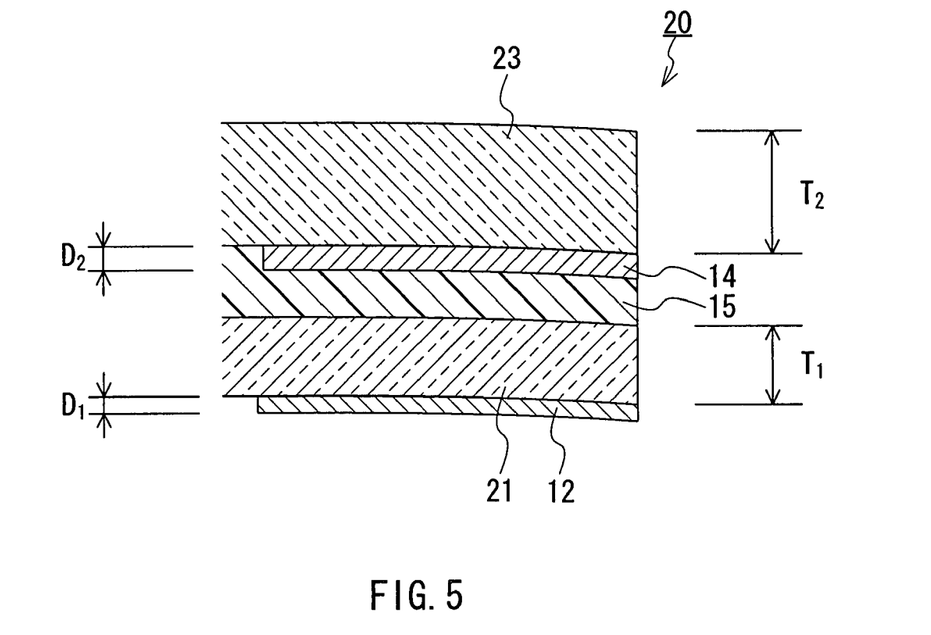
FIG. 5 is a cross-sectional view showing a laminated glass for vehicles according to another embodiment of the present invention.

In a laminated glass 20 shown in FIG. 5, the composition of a first glass sheet 21 is identical to that of a second glass sheet 23. The glass sheets 21 and 23 may be formed of clear glass or heat absorbing glass as described earlier. However, the thickness $T_2$ of the second glass sheet 23 is thicker than the thickness $T_1$ of the first glass sheet 21. Accordingly, the second glass sheet 23 has lower visible-light transmittance and solar transmittance as compared to the first glass sheet 21. Similarly in the case where such glass sheets 21 and 23 are bent and are bonded to each other, a laminated glass 20 with very small edge gaps (preferably almost none) can be manufactured when ceramic pastes 120 and 140 are printed according to the procedure described with reference to FIGS. 3A and 3B.

Still another example of a laminated glass for vehicles according to the present invention is described below.

Figure 6:
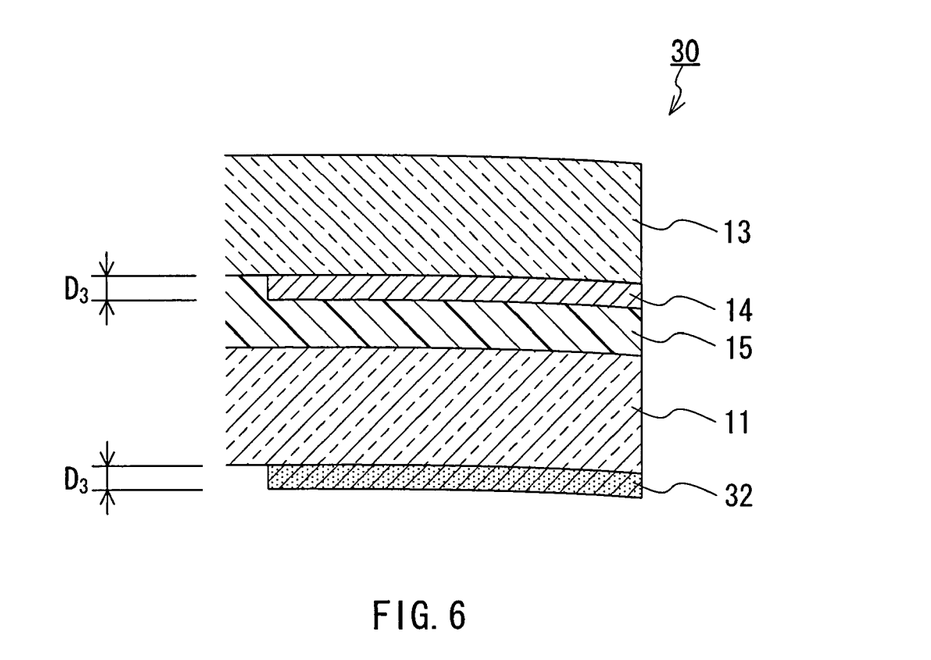
FIG. 6 is a cross-sectional view showing a laminated glass for vehicles according to another embodiment of the present invention.

In a laminated glass 30 shown in FIG. 6, a first glass sheet 11 is formed of clear glass while a second glass sheet 13 is formed of heat absorbing glass. The first and second glass sheets have the same thickness. Furthermore, the thickness $D_3$ of a first masking 32 provided on the concave surface of the first glass sheet 11 also is identical to that of a second masking 14 provided on the concave surface of the second glass sheet 13. However, the composition of a first ceramic paste used for forming the first masking 32 is different from that of a second ceramic paste used for forming the second masking 14.

Examples of the method for allowing the ceramic pastes to have different compositions from each other include allowing them to be different in the ratio between the glass paste and the inorganic pigments or allowing them to be identical in the above-mentioned ratios but to be different in composition of the inorganic pigment in such a manner that the first masking 32 has a higher visible-light transmittance than that of the second masking 14. With respect to this, the same as described above applies. The viscosities of the ceramic pastes and the mesh sizes of the screen masks can be adjusted suitably so that both the first masking 32 and the second masking 14 have the same thickness $D_3$. This makes it possible to reduce the difference in bend degree between the peripheral parts of the first glass sheet 11 and the second glass sheet 13, which is caused by firing shrinkage of the ceramic pastes.

As described above, in the present embodiments, examples were described in which maskings are formed on the concave surfaces of the first glass sheet and the second glass sheet. However, the effects of the present invention also can be obtained in the same manner even when the maskings are formed on convex surfaces. Furthermore, it also is possible to employ a reverse layout in which the first glass sheet with a higher solar transmittance is placed as an outer sheet while the second glass sheet with a lower solar transmittance is placed as an inner sheet. Similarly in this case, the effects of the present invention can be obtained.

EXAMPLES

A clear glass sheet with a thickness of 2.1 mm (FL, manufactured by Nippon Sheet Glass, Co., Ltd.) to be used as a first glass sheet and a heat absorbing glass sheet with a thickness of 2.1 mm (MFL, manufactured by Nippon Sheet Glass, Co., Ltd.) to be used as a second glass sheet each were produced by a known float glass process. The compositions of the respective glass sheets were adjusted so that the second glass sheet (outer sheet) had a lower solar transmittance than that of the first glass sheet (inner sheet).

With respect to these glass sheets, the visible-light transmittance (in a wavelength region of 380 to 780 nm), solar transmittance (in a wavelength region of 300 to 2500 nm), and infrared transmittance (at a wavelength of 1550 nm) were measured by using a spectrophotometer according to Japanese Industrial Standards (JIS) R3212:1998 and R3106:1998.

The clear glass sheet had a visible-light transmittance of 90.7%, a solar transmittance of 88.4%, and an infrared transmittance of 88.7%. On the other hand, the heat absorbing glass had a visible-light transmittance of 84.8%, a solar transmittance of 70.9%, and an infrared transmittance of 69.3%. The two types of glass sheets each were cut into the shape of a windshield. Thus a first glass sheet and a second glass sheet were obtained. The first and second glass sheets each were formed as a rectangle whose circumscribed portion had a size of 1000 mm (vertical direction)×1600 mm (transverse direction).

Next, a ceramic paste was printed on the peripheral portion of the second glass sheet. Then the second glass sheet was bent into a shape that allows it to fit into a window frame, by the press-bending method using a mold according to the procedure described above, and at the same time, the ceramic paste was fired. After being bent, the second glass sheet was cooled slowly at room temperature. In this manner, a plurality of second glass sheets each having a curved surface shape and a second masking formed thereon, were produced under the same conditions. The curvature radius around the center of each second glass sheet was, in the vertical direction, smallest at the upper end, specifically approximately 800 mm, and largest at the lower end, specifically approximately 22000 mm while being, in the transverse direction, smallest at the right and left ends, specifically about 1500 mm, and largest at the center, specifically about 5500 mm (all the values are design values). Furthermore, the width of the second masking was 30 mm to 100 mm although it varies depending on the place.

The composition of the second ceramic paste used for forming the masking on each second glass sheet included 70 wt % of borosilicate glass powder ($SiO_2$—ZnO—$B_2O_3$) used as glass frits, 15 wt % of black inorganic pigments ($Cr_2O_3$—CuO—MnO), 10 wt % of organic solvent of pine oil, and 5 wt % of resin composed of cellulose and rosin resins. This composition had a viscosity of approximately 150 dPa·s at room temperature.

On the other hand, first glass sheets each having a curved surface shape and a first masking formed thereon were obtained in the same manner as in the case of the second glass sheets except that the first ceramic paste to be used had a different composition. The first ceramic paste was prepared by further adding an organic solvent of pine oil to the second ceramic paste (with a viscosity of approximately 150 dPa·s) for forming the masking on each second glass sheet. Specifically, with the amount of pine oil to be added being varied gradually, a plurality of first ceramic pastes with viscosities of 30 to 100 dPa·s were obtained. The concentration of the pigments that mainly control various transmittances is high in the second ceramic paste and low in the first ceramic paste.

With the first ceramic pastes obtained above, a plurality of first glass sheets each having a dark-colored first masking formed at the peripheral part on the concave surface side were obtained. In this manner, the compositions of the first ceramic pastes were allowed to be different from that of the second ceramic paste, and thereby the amounts of the black pigments and glass frits that are contained in the first masking per unit area were allowed to be smaller than those of the black pigments and glass frits that are contained in the second masking. The curved surface shape of the first glass sheets was identical to that of the second glass sheets.

Next, each first glass sheet and a second glass sheet were stacked softly together with no resin interlayer film being interposed therebetween, in such a manner that the first glass sheet is disposed on the concave side (inner side) while the second glass sheet is disposed on the convex side (outer side). Then, at the peripheral part of the stacked assembly, the edge gap generated between the first glass sheet and the second glass sheet was measured. Table 1 indicates the results of measurement of the edge gap width. In Table 1, the viscosity of the first ceramic paste is increased gradually in each sample from Example 1 to Example 20.

After completing the measurement of edge gaps, test pieces of about 100 mm×100 mm were cut out of the respective first glass sheets and second glass sheets around the measurement position so as to include the masking parts. The glasses with the maskings of the test pieces were measured for visible-light transmittance.

Figure 7A:
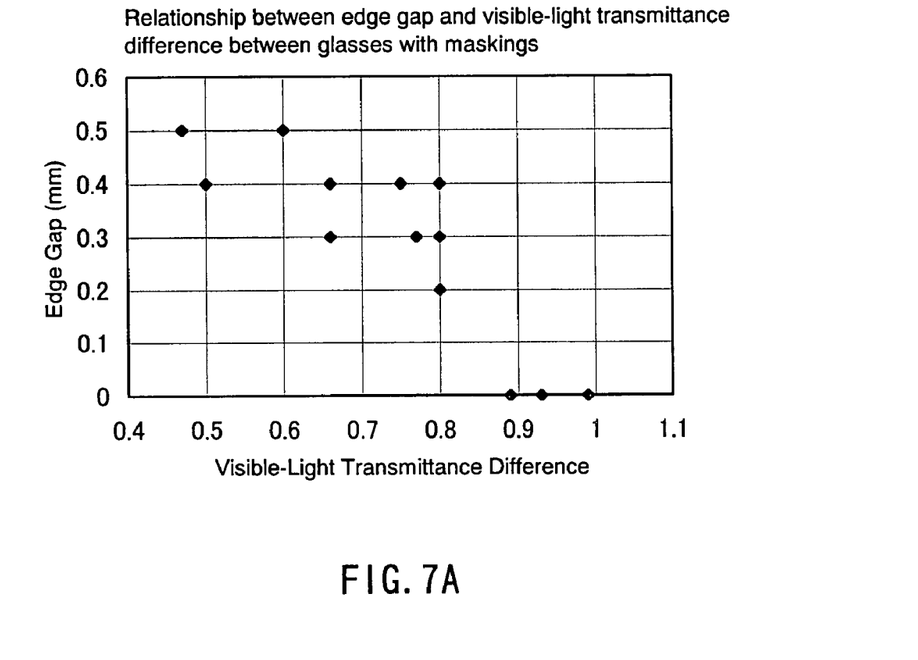
FIG. 7A is a graph showing the results of the examples.

Table 1 indicates measured values of visible-light transmittance of glass sheets each having the first masking, visible-light transmittance of glass sheets each having the second masking, and edge gaps, and the difference in visible light transmittance between the glass sheet with the first masking and the glass sheet with the second masking (the visible-light transmittance difference). FIG. 7A is a graph plotted based on the results indicated in Table 1.

TABLE 1

| Example | Visible-light transmittance (%) | | Visible-light transmittance difference | Edge gap (mm) |
|---|---|---|---|---|
| | First glass with first masking | Second glass with second masking | | |
| 1 | 1.06 | 0.07 | 0.99 | 0 |
| 2 | 1.05 | 0.06 | 0.99 | 0 |
| 3 | 0.99 | 0.06 | 0.93 | 0 |
| 4 | 0.97 | 0.04 | 0.93 | 0 |
| 5 | 0.97 | 0.04 | 0.93 | 0 |
| 6 | 0.96 | 0.03 | 0.93 | 0 |
| 7 | 0.98 | 0.09 | 0.89 | 0 |
| 8 | 0.98 | 0.09 | 0.89 | 0 |
| 9 | 0.87 | 0.07 | 0.80 | 0.2 |
| 10 | 0.87 | 0.07 | 0.80 | 0.2 |
| 11 | 0.87 | 0.07 | 0.80 | 0.3 |
| 12 | 0.87 | 0.07 | 0.80 | 0.3 |
| 13 | 0.87 | 0.10 | 0.77 | 0.3 |
| 14 | 0.71 | 0.05 | 0.66 | 0.3 |
| 15 | 0.87 | 0.07 | 0.80 | 0.4 |
| 16 | 0.87 | 0.12 | 0.75 | 0.4 |
| 17 | 0.71 | 0.05 | 0.66 | 0.4 |
| 18 | 0.57 | 0.07 | 0.50 | 0.4 |
| 19 | 0.71 | 0.11 | 0.60 | 0.5 |
| 20 | 0.57 | 0.10 | 0.47 | 0.5 |

In all Examples, the edge gaps were 0.5 mm or less. The edge gaps of less than 0.2 mm were indicated as 0 mm.

The visible-light transmittances of the glass sheets with the first maskings were 0.57 to 1.06%. The visible-light transmittances of the glass sheets with the second maskings were 0.03 to 0.12%. The masking parts of both the glass sheets each had a visible light transmittance of approximately 1% or less. Thus they had an almost perfect shielding effect and were not able to be differentiated visually from each other. The visible-light transmittance difference between two glass sheets with maskings was 0.47 to 0.99%. Among them, the visible-light transmittance differences of Examples 1 to 8, in which the edge gaps were less than 0.2 mm, were 0.89 to 0.99%, while the visible-light transmittance differences of Examples 9 to 20 in which the edge gaps were at least 0.2 mm were 0.47 to 0.80%.

When laminated glasses were produced using the above-mentioned examples with interlayer films being interposed, respectively, the allowable edge gap depends on the hardness of the interlayer films. For example, in the case of an interlayer film with a relatively low hardness (i.e. soft), such as an interlayer film having excellent sound insulation ability, an allowable edge gap is 0.5 mm or less. However, in the case of an interlayer film with a relatively high hardness (i.e. hard), such as a common interlayer film, the edge gap is preferably smaller. It is preferable that the edge gap be less than 0.2 mm since interlayer films of any hardness can be used.

Figure 7B:
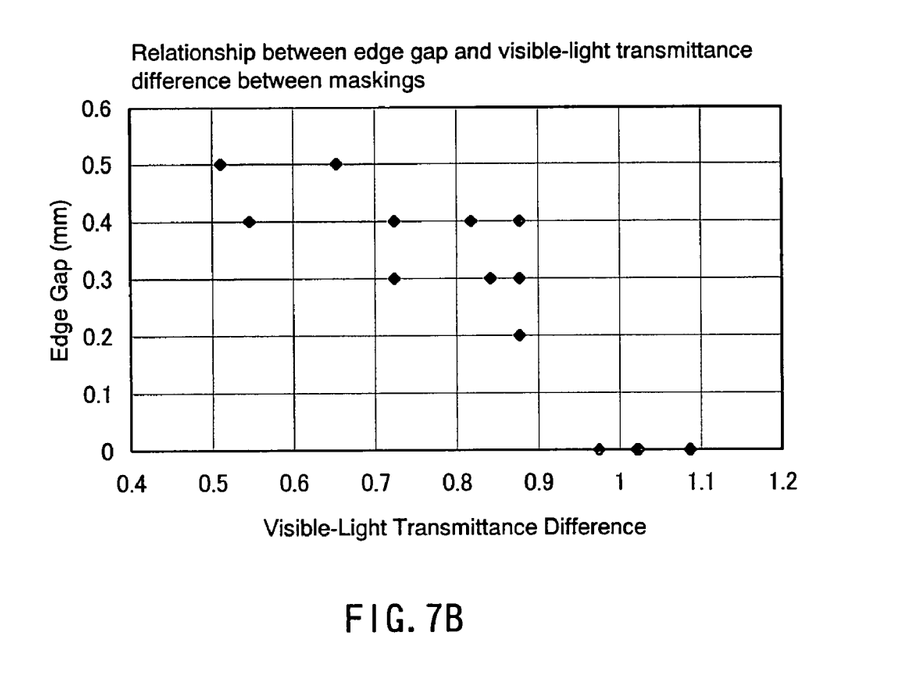
FIG. 7B is another graph showing the results of the same examples.

Since each masking is attached to the surface of the glass sheet by being fired, the visible-light transmittance of the masking alone cannot be measured. However, the visible-light transmittance of the masking alone can be approximated by a value obtained by dividing the visible-light transmittance of the glass sheet with the masking by that of the glass sheet alone. Table 2 indicates the visible-light transmittance of each masking alone. FIG. 7B shows a graph plotted based on the results indicated in Table 2.

TABLE 2

| Example | Visible-light transmittance (%) | | Visible-light transmittance difference | Edge gap (mm) |
|---|---|---|---|---|
| | First masking alone | Second masking alone | | |
| 1 | 1.17 | 0.08 | 1.09 | 0 |
| 2 | 1.16 | 0.07 | 1.09 | 0 |
| 3 | 1.09 | 0.07 | 1.02 | 0 |
| 4 | 1.07 | 0.05 | 1.02 | 0 |
| 5 | 1.07 | 0.05 | 1.02 | 0 |
| 6 | 1.06 | 0.04 | 1.02 | 0 |
| 7 | 1.08 | 0.11 | 0.97 | 0 |
| 8 | 1.08 | 0.11 | 0.97 | 0 |
| 9 | 0.96 | 0.08 | 0.88 | 0.2 |
| 10 | 0.96 | 0.08 | 0.88 | 0.2 |
| 11 | 0.96 | 0.08 | 0.88 | 0.3 |
| 12 | 0.96 | 0.08 | 0.88 | 0.3 |
| 13 | 0.96 | 0.12 | 0.84 | 0.3 |
| 14 | 0.78 | 0.06 | 0.72 | 0.3 |
| 15 | 0.96 | 0.08 | 0.88 | 0.4 |
| 16 | 0.96 | 0.14 | 0.82 | 0.4 |
| 17 | 0.78 | 0.06 | 0.72 | 0.4 |
| 18 | 0.63 | 0.08 | 0.55 | 0.4 |
| 19 | 0.78 | 0.13 | 0.65 | 0.5 |
| 20 | 0.63 | 0.12 | 0.51 | 0.5 |

Since the visible-light transmittance of the first glass sheet alone was 90.7% and that of the second glass sheet alone was 84.7%, the visible-light transmittance of the first masking alone was 0.63 to 1.17% and that of the second masking alone was 0.04 to 0.14%. In Examples 1 to 8 in which the edge gaps were less than 0.2 mm, the visible-light transmittance difference between the maskings alone was 0.97 to 1.09%. In Examples 9 to 20 in which the edge gaps were at least 0.2 mm, the visible-light transmittance difference between the maskings alone was 0.51 to 0.88%.

In the respective examples, the ratio between the black inorganic pigments and glass frits that were contained in the ceramic paste was the same. The difference was the ratio of the organic solvent but the organic solvent volatilizes through firing. Accordingly, as long as the printing is carried out using the same mask, the difference in composition of the ceramic paste results in the amount (weight) of the black inorganic pigments and glass frits to be applied per unit area. Thus it manifests as the difference in thickness of the masking after firing, in other words, the difference in weight per unit area. Since the visible-light transmittance of the first masking alone is higher than that of the second masking alone, it can be confirmed that the first masking is thinner than the second masking and the weight per unit area of the first masking is less than that of the second masking.

As described above, in the examples, in order to allow the bend degree of the first glass sheet to coincide with that of the second glass sheet, the composition of the first ceramic paste was adjusted. Conversely, however, in order to allow the bend degree of the second glass sheet to coincide with that of the first glass sheet, the composition of the second ceramic paste may be adjusted.

Furthermore, from the respective examples, it can be understood that when the difference in visible-light transmittance between the second masking part including the second glass sheet and the first masking part including the first glass sheet or the difference in visible-light transmittance between the second masking alone without the second glass sheet and the first masking alone without the first glass sheet is larger than a certain value, the difference in bend degree between the peripheral parts of the first glass sheet and the second glass sheet can be almost 0 mm. In addition, when the composition and thickness of glasses that are used for the first glass sheet and the second glass sheet are different from those of the present examples, the conditions for printing the ceramic pastes can be determined according to the method indicated in the examples.

The invention may be embodied in other forms without departing from the purposes of and essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A method of manufacturing a laminated glass for vehicles, the method comprising:
    A1: applying a first ceramic paste onto a principal surface of a peripheral part of a first glass sheet;
    A2: applying a second ceramic paste onto a principal surface of a peripheral part of a second glass sheet having a lower solar transmittance than that of the first glass sheet;
    B: bending the first glass sheet and the second glass sheet while forming dark-colored maskings by firing the first ceramic paste and the second ceramic paste applied to the respective glass sheets; and
    C: bonding the first glass sheet and the second glass sheet that have been bent to each other, with a resin interlayer film being interposed therebetween,
    wherein in the processes (A1) and (A2), in order to reduce the difference in bend degree between the peripheral parts of the first glass sheet and the second glass sheet, which is caused by firing shrinkages of the first ceramic paste and the second ceramic paste in the process (B),
    (i) an amount per unit area of the first ceramic paste to be applied to the first glass sheet is allowed to be different from that of the second ceramic paste to be applied to the second glass sheet, and/or
    (ii) the first ceramic paste and the second ceramic paste are allowed to have different compositions from each other.

2. The method of manufacturing a laminated glass for vehicles according to claim 1, wherein in the processes (A1) and (A2), the amount per unit area of the first ceramic paste to be applied to the first glass sheet is allowed to be less than that of the second ceramic paste to be applied to the second glass sheet, and
    in the process (B), the first glass sheet and the second glass sheet are bent so that their surfaces on which the ceramic paste has been applied are shaped as concave surfaces.

3. The method of manufacturing a laminated glass for vehicles according to claim 2, wherein in the processes (A1) and (A2), the first ceramic paste is applied to the first glass sheet to have a thickness that is thinner than that of the second ceramic paste that is applied to the second glass sheet.

4. The method of manufacturing a laminated glass for vehicles according to claim 2, wherein in the processes (A1) and (A2), the ceramic paste is applied to the first glass sheet and the second glass sheet in different patterns from each other.

5. The method of manufacturing a laminated glass for vehicles according to claim 2, wherein the first ceramic paste is applied to the first glass sheet in a mesh, sea-island, or stripe pattern while the second ceramic paste is applied to the second glass sheet in a solid pattern.

6. The method of manufacturing a laminated glass for vehicles according to claim 1, wherein the difference in solar transmittance between the first glass and the second glass sheet is obtained through a difference in composition between the first glass sheet and the second glass sheet.

7. The method of manufacturing a laminated glass for vehicles according to claim 6, wherein the first glass sheet has a thickness identical to that of the second glass sheet.

8. The method of manufacturing a laminated glass for vehicles according to claim 1, wherein the difference in solar transmittance between the first glass sheet and the second glass sheet is obtained, with the second glass sheet being thicker than the first glass sheet.

9. The method of manufacturing a laminated glass for vehicles according to claim 8, wherein the first glass sheet has a composition identical to that of the second glass sheet.

10. The method of manufacturing a laminated glass for vehicles according to claim 1, wherein in the processes (A1) and (A2), the first ceramic paste and the second ceramic paste are applied to each of the first glass sheet and the second glass sheet by a printing method using a mask.

11. The method of manufacturing a laminated glass for vehicles according to claim 1, wherein the process (B) is a process of bending the first glass sheet and the second glass sheet individually.

12. The method of manufacturing a laminated glass according to claim 11, wherein the process (B) is carried out by a press-bending method in which a softened glass sheet is sandwiched and shaped in a mold.

13. A laminated glass for vehicles, comprising:
    a first glass sheet that has been bent;
    a second glass sheet that has been bent in an identical shape to that of the first glass sheet and has been bonded thereto with a resin interlayer film interposed therebetween, the second glass sheet having a lower solar transmittance than that of the first glass sheet;
    a dark-colored first masking that has been provided on a concave surface of a peripheral part of the first glass sheet; and
    a dark-colored second masking that has been provided on a concave surface of a peripheral part of the second glass sheet,
    wherein (i) the first masking has a higher visible-light transmittance than that of the second masking and/or (ii) the first masking has a weight per unit area that is less than that of the second masking.

14. The laminated glass for vehicles according to claim 13, wherein the first masking has an identical composition to that of the second masking.

15. The laminated glass for vehicles according to claim 13, wherein the first masking and the second masking are different in composition from each other.

* * * * *